United States Patent Office 3,577,302
Patented May 4, 1971

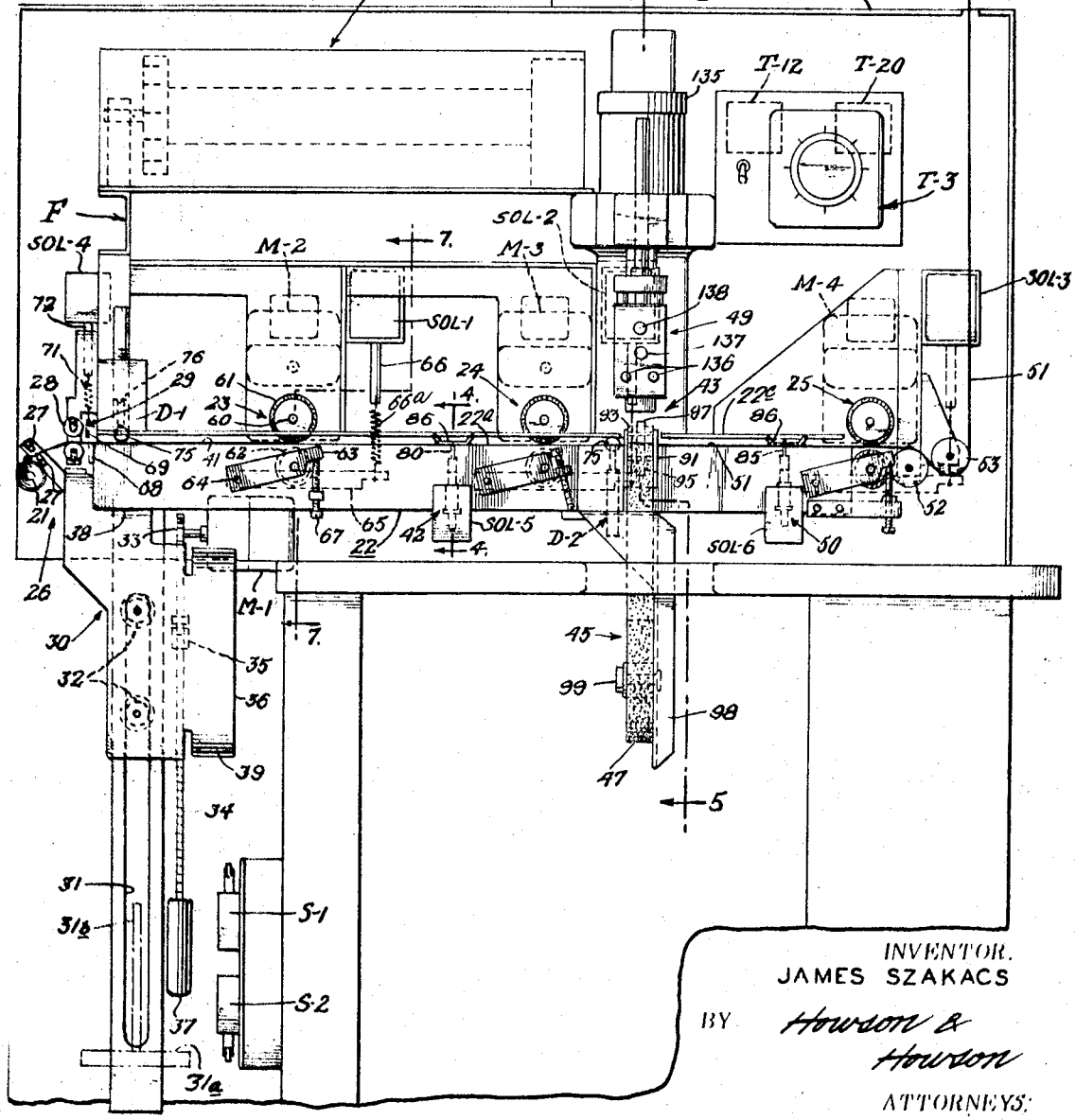

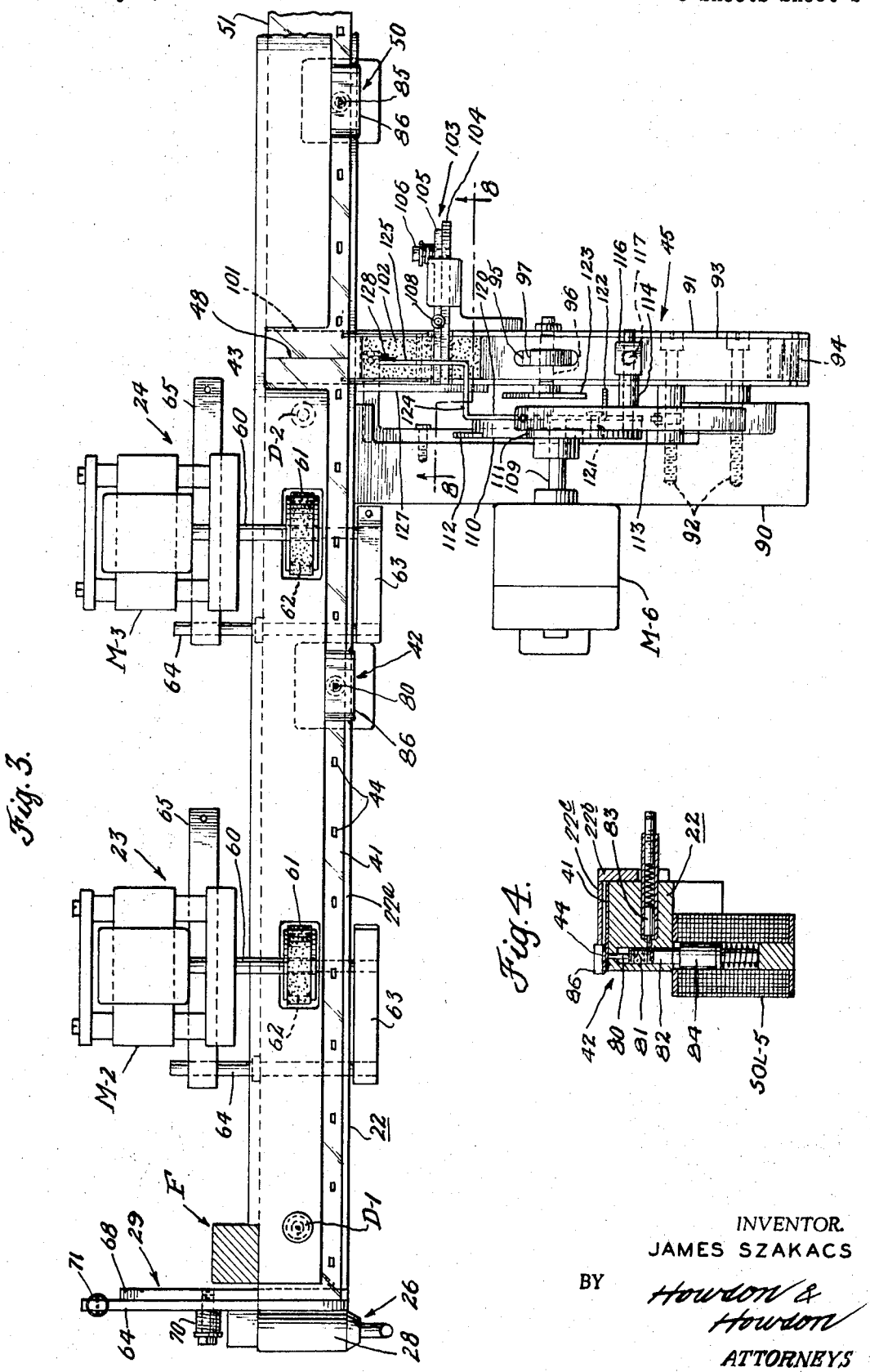

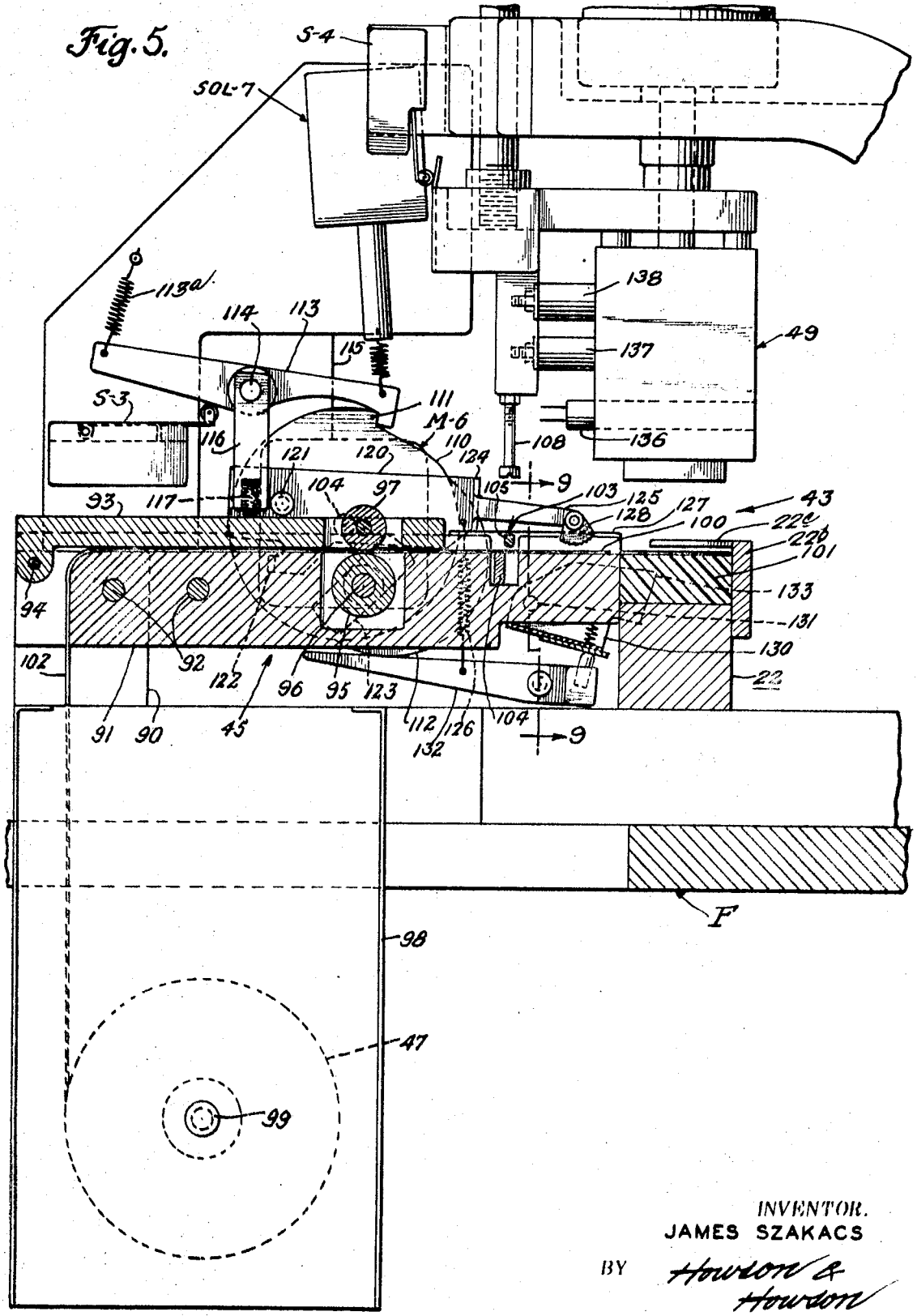

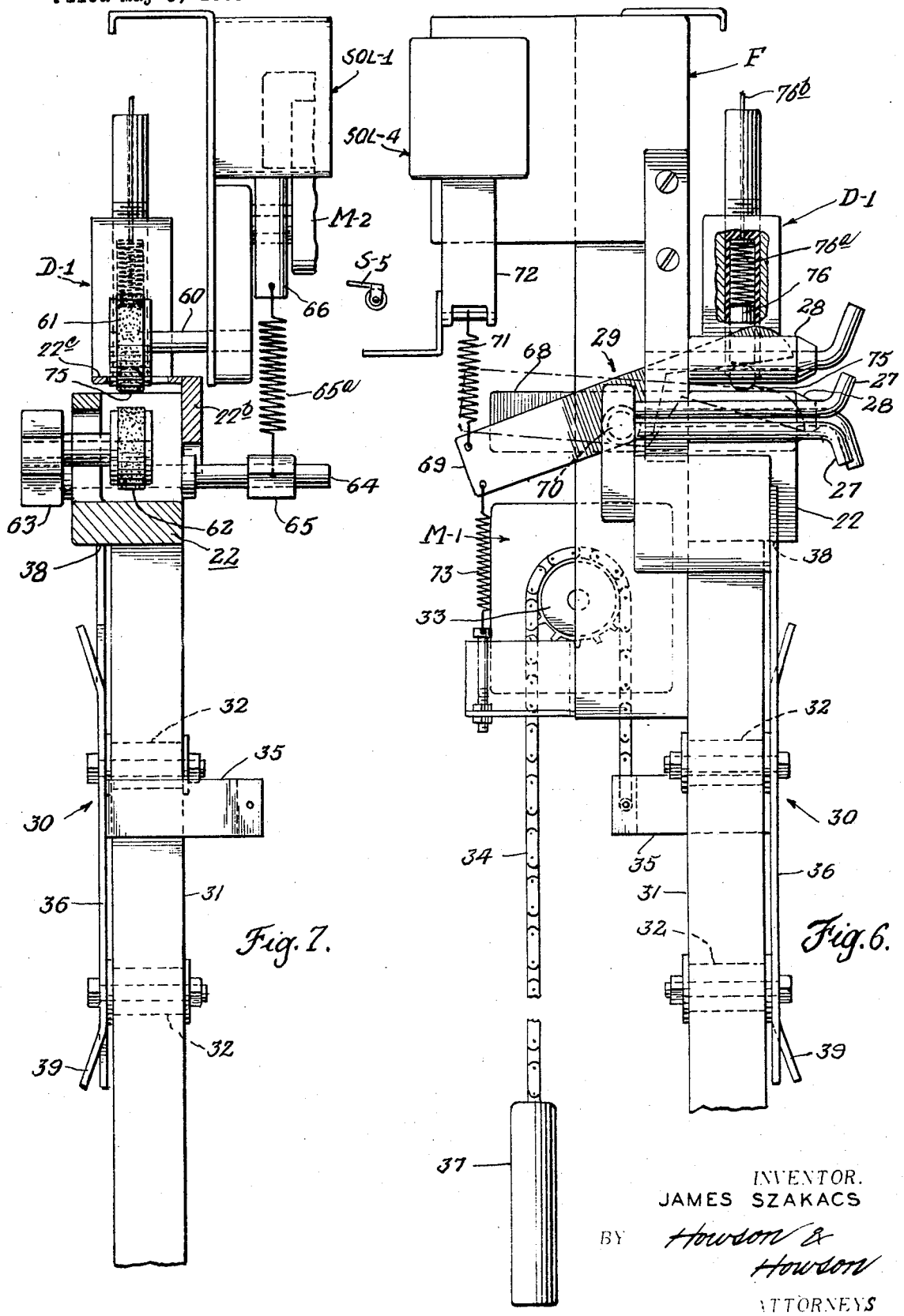

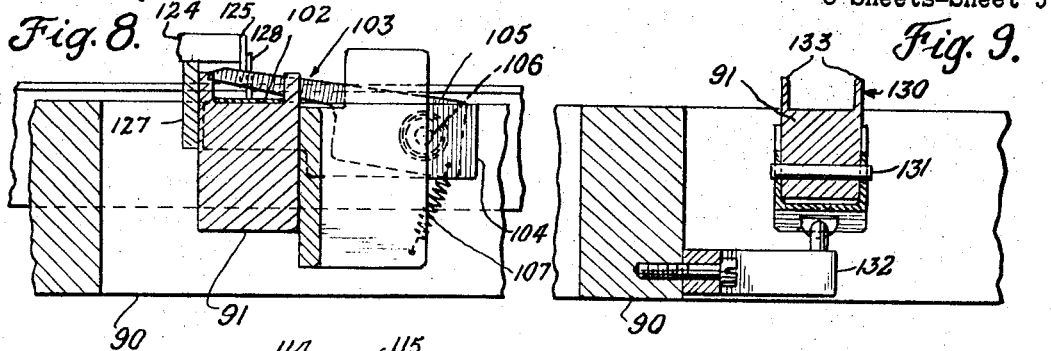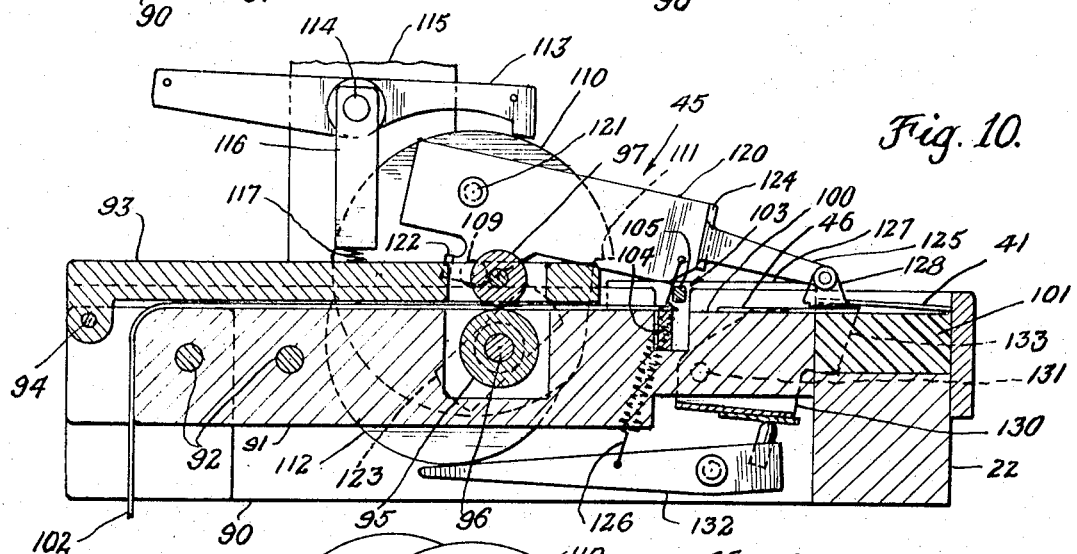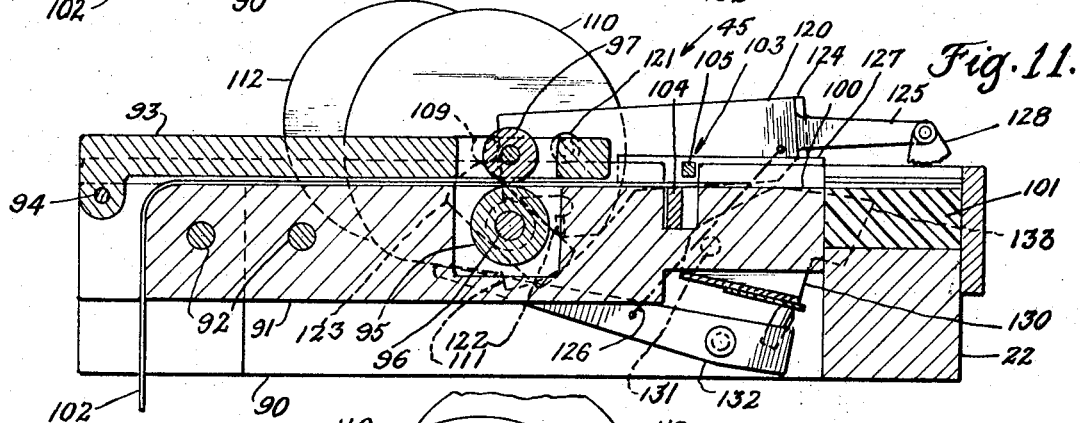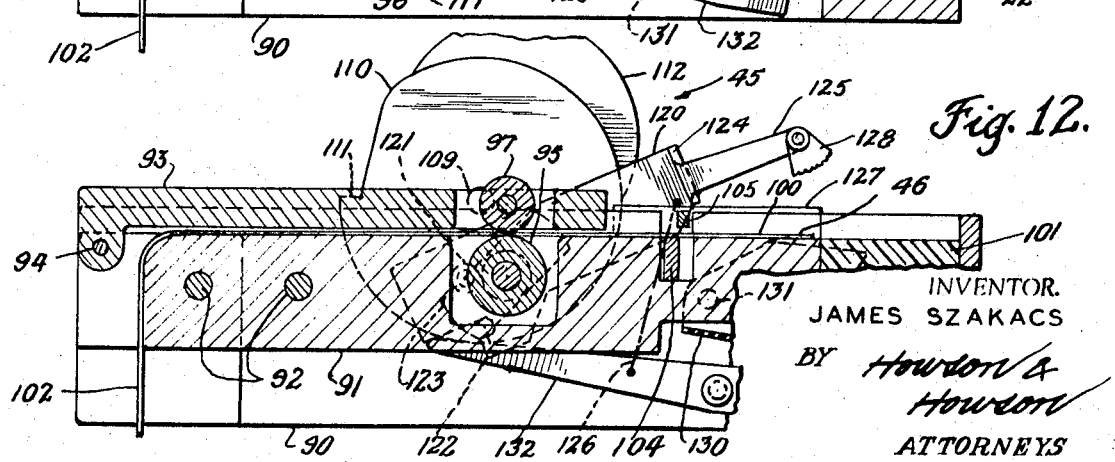

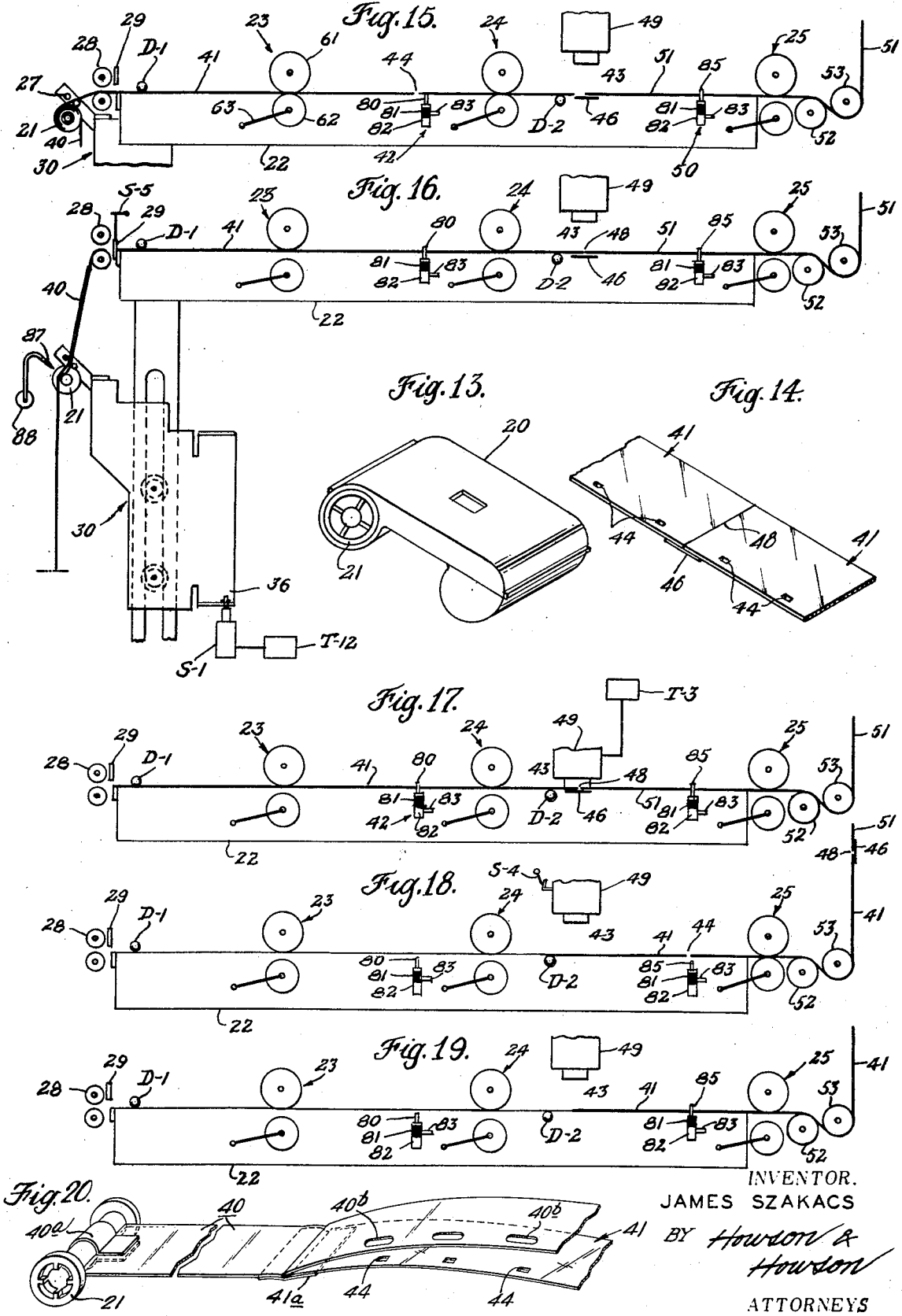

3,577,302
AUTOMATIC FILM SPLICING MACHINE
James Szakacs, 150 Pueblo Road,
New Britain, Pa. 18901
Filed May 8, 1968, Ser. No. 727,414
Int. Cl. B65h 21/00; G03d 15/04
U.S. Cl. 156—504          20 Claims

ABSTRACT OF THE DISCLOSURE

A machine for automatically splicing together lengths of exposed photographic roll film to form a continuous film strip suitable for processing through high speed automatic film processing, printing or other film handling equipment. The machine includes means for determining the length of a roll of film and for accurately cutting the film in proper registration with the film sprocket holes to remove the spool and paper backer. The machine automatically advances the lead edge of a film into abutting relation with the trailing edge of the preceding film in a splicing station, with the respective film sprocket holes in the proper registration. A strip of heat sealing splicing tape is then automatically inserted beneath the abutting film edges and a heat sealing ram is actuated for a predetermined time to complete the splice. The spliced film is then automatically wound onto a storage reel, the trailing edge of the film strip being stopped in the splicing station for attachment of the succeeding film length.

---

The present invention relates generally to apparatus for automatically joining short lengths of flexible material to form a single continuous strip. More specifically, the invention relates to apparatus for automatically splicing together exposed photographic films of varying lengths to form a continuous film strip suitable for passage through automatic film processing, printing or other film handling equipment.

Exposed photographic roll film is conventionally processed in large processing laboratories in automatic high speed continuous processing machinery. For passage through the processing machines, the short lengths of roll film are spliced end to end to form a lengthy reel of film having the appearance of a reel of movie film. This reel of exposed film is then fed continuously into the processing or other equipment and, following processing, is separated into individual lengths or exposures for return to the photographer. Appropriate identification marks are applied to the films prior to splicing to permit proper identification following processing.

In order to permit a controlled passage of the film through the processing, printing or other film handling equipment, the sprocket holes along an edge of the film are engaged by suitable drive sprockets. It is therefore essential that the sprocket holes of the spliced film strip be in proper registration, that is that they be accurately aligned and evenly spaced, to permit passage through printing or other film handling equipment.

Prior to the present development, the splicing of exposed films to produce a continuous strip of film for processing has been essentially a tedious manual operation. While certain devices have been developed to assist in such steps as cutting the film and heat sealing the splicing tape to the film ends, the film handling and sequence of operations have been exclusively under manual control. For example, in a typical conventional splicing operation, each film is manually unspooled and its length determined by reference to a suitable gauge. The film is then manually placed in a cutoff jig which cuts the film end in a predetermined relation with the sprocket holes. The film is then manually transferred to a splicing device and placed with its leading edge abutting the trailing edge of the preceding film. A strip of heat sealable splicing tape is then lapped over the abutting film ends and a heated sealing ram is then manually actuated to effect the splice. A film accumulating reel is then manually actuated to wind the newly spliced film onto the reel with the trailing edge remaining in the splicing device for attachment of the succeeding film.

In the present invention, all of the operations described which previously were carried out manually at a relatively slow pace, are now effected automatically in a high speed sequence. The machine of the present invention automatically strips a roll of exposed film from its spool and paper backer while sensing its length and cutting off the trailing edge of the film in proper registration to the sprocket holes thereof, advances the film into a splicing station with the leading film edge in abutting relation with the trailing edge of the previous film, the sprocket holes being aligned and accurately registered, dispenses and positions beneath the abutting film ends a strip of splicing tape and heat seals the tape to the film, and advances the spliced film onto a film accumulating reel, halting the continuous film strip with the trailing edge thereof in a predetermined position in a splicing station. The machine operator need only feed the leading edge of an exposed roll of film to the machine to start the described sequence of operations which are then automatically and rapidly effected. Since many of these operations must be carried out under darkroom conditions and with some films under total darkness, the importance of a machine which can carry out these functions in a completely automatic manner can be appreciated. The machine illustrated and described herebelow has a capacity of carrying out about 350 splices per hour or more which far exceeds the rate at which these operations can be carried out manually.

A primary object of the present invention is to provide a splicing apparatus of the character described which is automatically operative through steps of operation including in general, a film feeding and cutoff step, a splicing tape dispensing and bonding step, and a film reeling step.

Another object of the invention is the provision of apparatus adapted to splice together films of intermixed lengths into a continuous strip of film in a very rapid order.

A further object of the invention is the provision of film actuated means for automatically activating a number of components to effect a series of operative steps.

It is still another object of the invention to provide a control system employing compactly arranged control components whereby films of different lengths can be spliced together in random length order without the necessity of any adjustments or time consuming setup operations.

Another object of the invention resides in the provision of simple and effective means for threading the film into the machine and for automatically stripping or combing off the usual paper backer of the film as the film is fed into the machine.

An important object of the invention resides in the provision of film threading means which permit the ready blind threading of exposed film into the machine in a dark room.

A further object of the invention is the provision of effective means for dispensing splicing tape to the abutting ends of films to be spliced together in an accurately measured length equal to the width of the film.

Still another object of the invention is to provide a splicing apparatus which applies a heat sealable splicing tape to the emulsion side of the film ends, the heat sealing element being applied to the opposite side of the film whereby a rapid heat transfer and setting of the splicing tape is effected.

A still further object of the invention is to provide a film splicing machine as described which effects an automatic cutting and splicing of roll film lengths into a continuous strip while maintaining the film sprocket holes in accurate registration to permit passage of the continuous film through printing or other film handling equipment.

An additional object of the invention is to provide a splicing apparatus as described which may be readily adapted for splicing of previously developed films of various lengths.

Additional objects and advantages of the invention will be more readily apparent from the following detailed description of an embodiment thereof when taken together with the accompanying drawings in which:

FIG. 1 is a front elevational view of a splicing machine constructed in accordance with the present invention;

FIG. 2 is an enlarged fragmentary detail view of the apparatus of FIG. 1 illustrating the manner in which a film is threaded into the machine;

FIG. 3 is a somewhat enlarged plan view of a portion of the machine shown in FIG. 1;

FIG. 4 is an enlarged cross-section taken on the line 4—4 of FIG. 1 illustrating a film registering stop device employed in the machine;

FIG. 5 is an enlarged cross-section taken on the line 5—5 of FIG. 1 illustrating the splicing tape dispensing and bonding mechanism;

FIG. 6 is an enlarged end elevational view of the machine looking toward the right in FIG. 1;

FIG. 7 is an enlarged vertical section taken along the irregular line 7—7 of FIG. 1;

FIG. 8 is a fragmentary cross-sectional taken along line 8—8 of FIG. 3 illustrating the tape cutter of the splicing-tape dispensing mechanism;

FIG. 9 is a fragmentary cross-section taken on the line 9—9 of FIG. 5 illustrating the film-lifting device employed in association with the splicing-tape dispensing mechanism;

FIG. 10 is a fragmentary cross-section of the splicing-tape feeding mechanism shown during introduction of the splicing tape beneath the film;

FIGS. 11 and 12 are views similar to FIG. 10 showing the tape feeding mechanism in successive positions;

FIG. 13 is an isometric view of a cartridge containing a film of the type for which the illustrated apparatus is particularly adapted;

FIG. 14 is an isometric view of a completed splice;

FIGS. 15–19 are diagrammatic views illustrating various steps in the operation of the machine; and FIG. 20 is a fragmentary isometric view showing the manner of attachment of the film to its paper backer, and the backer to the spool.

The apparatus illustrated in the drawings and described hereinbelow is specifically adapted for the splicing of Kodak Instamatic or other similar type roll film although it will be obvious that the same machine may be adapted for use with film of other sizes. The Instamatic film is prepacked in cartridges 20 as shown in FIG. 13 and following exposure is accumulated on the spool 21 thereof upon which it is removed for processing. The Instamatic films are available in either twelve or twenty exposure lengths, the film, cartridge and spool being substantially identical for eight length film aside from the length of the film itself. As shown in FIG. 20, the film 41 is not attached directly to the spool 21 but is attached by a tape 41a to a paper backer 40, one end of which is attached to the spool 21 by means of a tape loop 40a. The paper backer 40 is substantially longer than the film 41 so that upon spooling of the film, the film does not wind against itself which might cause scratching of the emulsion. The film is attached to the backer with the dull emulsion side facing away from the backer strip to permit exposure thereof during passage through the cartridge. The edge of the film is attached to the backer at a point spaced substantially from the spool 21 to provide a length of the backer which serves as a leader to prevent exposure of the film during loading of the cartridge. Similarly, the free end of the backer is substantially longer than the film to provide additional protection for the film after the film has been fully exposed and wound onto the spool. Sprocket holes 44 provided in the film facilitate handling of the film in automatic equipment as mentioned above. Corresponding slots 40b in the paper backer permit engagement of the sprocket holes 44 by a sprocket without fouling the backer.

The present apparatus is adapted to receive the free end of a spool of film such as that shown in FIG. 20, determine whether it is a twelve or twenty exposure roll, cut off the film at the appropriate spot freeing the backer and spool, splice the free or leading end of the film to the trailing end of the preceding film to form a spliced joint 48 as shown in FIG. 14 having a length of splicing tape 46 heat sealed thereacross to the dull emulsion side of the film, and wind the spliced film onto a storage reel. The cutting of the film and the splicing thereof are carried out in such a manner as to maintain an accurate registration of the sprocket holes 44 as illustrated in FIG. 14, the holes being maintained in alignment at the proper equidistant spacing.

The present apparatus as illustrated particularly in FIGS. 1–3 and 5 and in the schematic views of FIGS. 15–19, includes a frame F supporting a longitudinally extending horizontal film track 22 along the upper surface 22a of which film may be advanced by means of first, second and third film feed roll units 23, 24 and 25, respectively. A film threading device 26 located at the infeed end of the film track 22 includes a pair of stripper pins 27 and a pair of guide rolls 28 between which the film is threaded and led to the first feed roll unit 23. The film so threaded passes between the open knives of a film cutter 29 adjacent the end of the film track and beneath an electric detector D–1 adjacent the knives.

The stripper pins 27 are carried by a vertically reciprocable comber device 30 mounted in a vertical track 31 on the frame F by means of rollers 32. A torque motor M1 on the frame acting through sprocket 33 and chain 34, which is connected at one end to a bracket 35 of comber plate 36 and at the other end to weight 37, serves to move the comber device upwardly along the track 31 into the position shown in FIG. 1 wherein the plate 36 is engaged with the film track 22 at 38.

As shown in FIGS. 1 and 2, a spooled film is presented to the splicing machine by introducing the free end of the film emulsion side down beneath the guide rolls 28 on the frame F, feeding the film along the track surface 22a into the nip of the feed roll unit 23. As shown most clearly in FIG. 2, the tension of the coiled film on the spool 21 holds the spool and the remainder of the film and paper backer against the stripper pins 27 which serve to comb the backer and spool from the film as the film is advanced by the feed roll units along the track 22. As will be described hereinafter, when the leading edge of the film is advanced into the desired position in the splicing station, the film feed is halted and the motor M1 is deenergized to permit the comber device 30 to ride down the track 31 under gravity force. As shown in FIG. 16, if a twelve exposure film is threaded into the machine, the stripper pins 27 of the comber device will reach the end of the backer when the cam surface 39 of comber plate 36 engages a limit switch S1 on the frame F. The momentary pause of the downward travel of the comber device is sensed by the timer T–12 connected with the switch S1 which energizes the film cutoff knives 29. The knives have just been actuated in the schematic showing of FIG. 16.

When a twenty exposure film is fed onto the track 22 and advanced with its leading edge in the splicing station, the comber device 30 moves past the switch S1 before the timer T–12 can actuate the film cutter 29, and drops until its movement is halted by contact of the pins 27 with the spool 21, at which point the cam surface 39 engages a second limit switch S2 located an appropriate distance below the switch S1. The closing of switch S2 in this manner activates a timer T-20 which in turn initiates a certain control sequence to be described hereinafter.

When the film 41 is inserted under the electric detector D-1 in the threading operation, the first and second feed roll units 23 and 24 are started, and when the leading end of the film is presented to the nip of the rotating rolls of the first unit 23, the film is advanced along the film track surface 22a, through the second feed roll unit 24 and is automatically stopped when the leading edge of the film is centered in the splicing station 43. The accurate positioning of the film end in the splicing station is an important aspect of the invention and is accomplished by means of a detector D-2 adjacent the splicing station which releases a retracted stop pin device 42 positioned beneath the film edge which then engages the succeeding sprocket hole of the film thereby halting the film in a predetermined registration and stopping the feed roll units in a manner to be described in detail hereinafter.

The splicing station 43 includes a tape dispensing mechanism 45 adapted to cut off a measured length of splicing tape 46 from a supply roll of tape 47 and position it beneath the film at the splicing joint 48 (FIG. 3). The splicing station also includes a vertically disposed air-actuated heated ram 49 adapted to automatically descend and dwell in pressure bonding relation over the abutting film ends and splicing tape a sufficient length of time to heat seal the tape and film together in a secure splice.

Between the splicing station 43 and the third feed roll unit 25 is located a second stop pin device 50 positioned to cooperate with the sprocket holes 44 of the film to position and hold the previously spliced film 51 in a fixed position with its trailing end centered in the splicing station to abut the leading end of the newly presented film 41 as shown in FIG. 16. The third feed roll unit 25 is located adjacent the discharge end of the film track 22, and the spliced film is led from this feed roll unit over guide rolls 52 and 53 and then upwardly over guide roll 54 onto a demountable reel 55 driven by a motor M-5.

A general description of the elements of the splicing machine having been set forth above, a more specific description of the components thereof is presented below.

FILM FEED ROLL UNITS

The first, second and third feed roll units 23, 24 and 25 are driven by gear motors M-2, M-3 and M-4, respectively which are suitably mounted above the track 22. Since the feed roll units are substantially identical only the first unit 23 will be described in detail.

Referring to FIGS. 1 and 3, the drive shaft 60 of motor M-2 has a drive roll 61 secured thereon and positioned such that the periphery of the roll is slightly above the track surface 22a of the film track 22. Located directly below the roll 61 is a pinch roll 62 rotatably mounted on a shaft 62a extending from an arm 63 disposed parallel to and adjacent the front face of the track 22. The arm 63 is secured to a shaft 64 extending through the track 22 to the rear of which is secured a second arm 65 adjacent the rear face of the track. As shown in FIGS. 1 and 7, the free end of the arm 65 is connected by a spring 65a to the core 66 of solenoid SOL-1. As shown in FIGS. 3 and 7, the track 22 is cut away in the vicinity of the feed roll units to permit the drive roll 61 and the pinch roll 62 to be brought together with the film passing therebetween. When the solenoid SOL-1 is energized, the pinch roll rocks upwardly and resiliently urges the film against the upward driven roll 61 to feed the film along the track 22. Both the drive roll and pinch roll are suitably surfaced to prevent scratching of the film while providing a sufficient grip thereof to uniformly feed it along the track. The actuating solenoids for the feed roll units 24 and 25 are indicated as SOL-2 and SOL-3 in FIG. 1. An adjustable stop screw 67 is provided to permit adjustment of the position of the pinch roll 62 when the solenoid is deenergized.

The film track 22 is provided along the rear of the track surface 22a with a guide wall 22b secured to the back wall of the track. A film retaining plate 22c extends from the guide wall 22b spaced slightly above the track surface 22a and extending about three quarters of the way across the track surface. The plate 22c is apertured as shown in FIG. 3 for the drive rolls 61 and the detector D-1, and is interrupted at the splicing station 43 for the ram 49. When the film is fed onto the track surface 22a, it is guided against the rear guide wall 22b and is prevented from curling, as is its natural tendency, by the plate 22c. Once the film has been engaged by the feed roll units, it will be retained in its proper position on the track and properly positioned in the splicing station by means to be presently described.

FILM CUTTER

The film cutter 29 as shown most clearly in FIG. 6 comprises a stationary knife blade 68 fixedly secured to the track 22, and a cooperating cutter blade 69 pivotally mounted at 70 to the stationary blade in shearing engagement with the stationary blade. The rearward extending end of the cutter blade is connected by a spring 71 to the core 72 of an actuating solenoid SOL-4. The cutter blade 69 is yieldingly held in an open position by a spring 73 extending between the rearwardly extending end of the cutter blade and a portion of the frame extending therebelow. Actuation of the solenoid SOL-4 drives the core 72 upwardly thereby rotating the cutter blade 69 into shearing cooperation with the stationary blade 68 as shown in broken lines in FIG. 6.

ELECTRIC DETECTORS AND STOP PIN DEVICES

As shown in FIGS. 1, 6 and 7, the electric detectors D-1 and D-2 each comprise a smooth current conductive metal ball 75 resiliently held in rolling contact with the film track by the spring loaded cylindrical contact member 76. The ball and contact member are slidably housed within a barrel-shaped insulator 76a shown most clearly in FIG. 6. The metal ball 75 in the absence of a film on the track conducts a current between the metal track 22 and the contact member 76 and spring 76a which then passes from the detector through the wire 76b extending from the spring chamber. Upon passage of a film between the ball 75 and the track surface 22a, the current passing through the detector is broken, thus signaling the presence of the film at the detector location.

In view of the elementary nature of the electrical circuitry connecting the several motors and solenoids with their actuating switches, a detailed illustration of the circuitry is not specifically set forth. In the preferred embodiment, however, the sequence of operations is most conveniently established by means of a well known sequence stepping switch, or other electrical steps such as a commercially available drum type "Agastat," diagrammatically indicated at 77 in FIG. 1. The appropriate connections of the various electrical components illustrated and discussed herein to effect the desired sequence of operations is conventional and well within the capabilities of a technician skilled in this art.

The stop pin device 42, which is substantially identical to the stop pin device 50 which accordingly will not be described in detail, as best shown in FIGS. 1 and 4 includes a stop pin 80 mounted in a vertical bore in the track 22. The stop pin 80 includes an insulated portion 81 and an electrically conductive portion 82. Mounted in a lateral intersecting bore in the track 22 is an associated electrical contact member 83 which is spring loaded toward the stop pin 80. The stop pin 80 is secured to the spring loaded core 84 of a solenoid SOL-5. When the solenoid is deenergized, the stop pin will be urged under the influence of the solenoid spring into a raised position. An apertured guide plate 86 attached to the plate 22c is disposed above the stop pin to hold the film against the track surface 22a when the stop pin is spring biased upwardly thereagainst. The stop pin 80 is located from the rear guide wall 22b a distance placing it exactly beneath the line of the film sprocket holes.

The stop pin device works as follows. When the leading edge of the film advanced along the track 22 by the feed roll units 23 and 24 reaches the electric detector D–2, solenoid SOL–5 of the stop pin device is deenergized to release the spring loaded stop pin 80. The stop pin device is longitudinally positioned along the track 22 so that the release of the stop pin 80 takes place between the spaced sprocket holes of the film, it being understood that the leading edge of the film will always bear a fixed relation to the sprocket holes. In this regard, it can be seen in FIG. 3 that the leading edge of the film is spaced approximately one-half of the distance between sprocket holes from the first sprocket hole. Similarly, it will be noted that the film cutter is positioned with respect to the stop pin 80 and center of the splicing station so that the trailing edge of the film will be spaced one-half the distance between sprocket holes from the last sprocket hole of the film. The stop pin 80 must then be positioned so that when a sprocket hole of the film passes thereover, the leading edge of the film will be centered in the splicing station in substantially abutting relation with the trailing edge of the preceding film as is illustrated in FIG. 3 and also in FIG. 16. (In the schematic FIG. 16, a slight gap is shown between the abutting film ends to indicate the film ends. If such a gap is actually desired, the position of the film cutter should be adjusted accordingly.)

When the spring loaded stop pin 80 is released by the electric detector D–2, it is urged upwardly against the film edge and enters the next sprocket hole to pass thereover, the apertured guide plate 86 preventing upward displacement of the film under the influence of the spring loaded stop pin. The upper end of the stop pin is preferably slightly smaller than the film sprocket holes to permit ready entrance of the pin into the holes.

Entrance of the stop pin 80 into a film sprocket hole anchors the film in the correct position for splicing and at the same time permits the electrically conductive portion 82 thereof to contact the electrical contact member 83 thereby through an appropriate electrical connection stopping the motors M–2 and M–3 of the feed roll units 23 and 24. This electrical connection also serves to actuate the stepping switch to advance the cycle of operation of the machine as will be discussed in detail herebelow. Actuation of the stop pin 80 releases the comber device 30 and in the case of a twelve exposure film by means of the timer T–12 results in the actuation of the film cutter 29, trimming the film trailing end and triggering an air blast from a blower 88 and nozzle 87 (FIG. 16) which ejects the paper backer and spool from the machine into an appropriate waste receptacle (not shown).

SPLICING TAPE DISPENSING UNIT

Referring particularly to FIGS. 1, 3–5 and 8–12, the splicing tape dispensing unit 45 located at the splicing station 43 includes a base member 90 supported by the frame F and extending laterally outwardly from the film track 22. A splicing tape track 91 secured to the base member 90 by bolts 92 includes a splicing tape hold down bar 93 pivoted thereto at 94. A driven feed roll 95 for advancing splicing tape along the tracks 91 is secured on a shaft 96 journaled in the track. A pinch roll 97 is journaled in the pivoted hold down bar 93 directly above the driven feed roll 95. A fixed bracket 98 depends downwardly from the base member 90 and includes a spindle 99 for receiving a supply roll of splicing tape 47.

As shown in FIG. 3, the tape track 91 is aligned with the center line of the splicing station 43 and extends perpendicularly to the film track 22. The upper tape-engaging face 100 of the tape track 91 is on the same level as the face 22a of the film track as shown in FIGS. 5, 10–12. A Teflon insert 101 is provided in the film track 22 at the splicing station which serves as a cushion during application of the heated ram 49 and also prevents sticking of the spliced film to the film track.

A run of splicing tape 102 is led upwardly from the supply roll 47 across the upper face 100 of the tape track, between the rolls 95 and 97 and between the blades of the tape cutter 103. A predetermined length of splicing tape 46 (FIG. 10) is cut off by the tape cutter 103 and fed to the film joint in a manner to be presently described.

The tape cutter 103 as shown most clearly in FIG. 8 is similar to the film cutter 29 described above and comprises a stationary knife blade 104 mounted flush with the surface 100 of the tape track, and a cutter blade 105 pivoted at 106 in shearing relation with the stationary blade 104. A spring 107 normally holds the cutter blade 105 in the open position. An adjustable stud 108 (FIG. 5) carried by the reciprocating splicing ram 49 engages the cutter blade 105 during its downward stroke to cut off the predetermined length of splicing tape 46.

Considering the manner in which a predetermined length of splicing tape is fed through the cutter blades for cut off, it may be seen in FIGS. 3 and 5 that the drive shaft 109 of drive motor M–6 mounted on base 90 carries a cam 110 having a stop tooth 111 and a cam lobe 112. The stop tooth 111 cooperates with a spring-loaded dispenser claw 113 pivoted at 114 on bracket 115 of the frame F. The claw 113 is normally resiliently urged downwardly into engagement with the stop tooth 111 of the cam 110 by spring 113a. The claw is released from the stop tooth 111 by the energizing of solenoid SOL–7 permitting clockwise rotation (as viewed in FIG. 5) of the cam 110 through one revolution by the motor M–6. The claw 113 actuates the switch S–3 upon release from and upon reentry into the stop tooth 111, the reentry signaling the stepping switch to advance to its next step as discussed further herebelow. As shown in FIG. 5, an arm 116 having a socketed spring 117 depends from the claw pivot 114 and engages the tape holddown bar 93 to resiliently hold the splicing tape between the feed roll 95 and pinch roll 97.

Intermittent drive is imparted to the splicing tape feed roll 95 by means of a drive plate 120 pivotally mounted on the face of the cam 110 by a pin 121 and having a projecting tab 122 adapted as the cam rotates to engage and rotate a flipper plate 123 secured at the end of the feed roll shaft 96 (FIG. 3). The flipper plate and shaft 96 are rotated through one-half of a revolution for each revolution of the cam 110, and the circumference of the feed roll 95 is so calculated that a length of splicing tape equal to the width of the film is advanced toward the film track 22 for each one-half revolution of the feed roll.

The drive plate 120 extends in a laterally bent portion 124 and a parallel arm portion 125 toward its free end, the portion 124 extending so as to position the arm portion 125 approximately over the center of the splicing tape as shown in FIG. 3. The drive plate 120 is urged downwardly by a spring 126 (FIG. 5) so that the bottom of the portion 124 engages and rides on a flat cam plate 127 secured to the side face of the tape track 91. The parallel arm 125 of the drive plate 120 includes a replaceable serrated shoe 128 detachably secured at its free end.

In the position of the parts shown in FIG. 10, the claw 113 has been tripped and the cam 110 has rotated approximately 90° in a clockwise direction. The drive plate 120 has rocked to the position shown in which the shoe 128 has advanced the previously measured length of splicing tape 46 toward the film on the film track 22. The tab 122 has not yet reached the flipper plate 123 and therefore no feed of tape from the supply roll has taken place.

The length of measured splicing tape 46 must be inserted beneath the abutting film ends since the tape will only adhere to the dull emulsion side of the film. To accomplish this end, means are provided to lift the edges of the abutting film ends for the insertion of the splicing tape therebeneath. This means comprises a U-shaped lifter member 130 pivoted on the track 91 at 131, which member is rocked upwardly to the position shown in FIG. 10 by means of a spring loaded lever 132 actuated by the cam lobe 112 of the cam 110. In this position of the member 130, the side wings 133 thereof lift the film a sufficient amount to enable free entry of the tape under the film therebetween as clearly shown in FIG. 10.

In FIG. 11, the cam 110 has rotated to a position in which the lateral portion 124 of the drive plate 120 is riding on the flat cam plate 127 with the result that the shoe 128 is raised upwardly away from the film track. During the movement of the drive plate 120 from the position of FIG. 10 to the position of FIG. 11, the projecting tab 122 thereof has engaged the flipper plate 123 and rotated it and the tape feed roll 92 in a clockwise direction to draw tape from the supply roll and feed it past the open cutter 103 toward the film track. In addition, the cam lobe 112 has left the lever 132 and the lever has rocked to a position in which the film lifter 130 is lowered to its normal position.

In FIG. 12, the cam 110 is shown rotated to a position in which the projecting tab 122 of the drive plate 120 is just about to ride clear of the flipper plate 123, it being noted that the lateral portion 124 of the drive plate is still riding on the flat cam plate 127. As rotation of the cam 110 continues, the tab 122 leaves the flipper plate 123 and the flipper plate and feed roll 95 stop their rotation after having completed one-half of a revolution and having advanced the desired measured length of tape 46 in readiness for cutoff by the cutter 103. The cam 110 then continues to rotate until it is stopped, after one complete revolution, by the claw 113 at which point the mechanism is restored to the initial position shown in FIG. 5.

SPLICE BONDING RAM

Following a complete revolution of the cam 110 as discussed above, the stepping switch is actuated by the release of the switch S–3 upon reseating of claw 113 in the stepped tooth 111, thereby actuating the heated ram 49 by causing air pressure to enter the cylinder 135 thereof, thus lowering the ram to heat bond the splicing tape and film firmly together. The ram 49 is heated by means of well known electrical heating elements 136 (FIGS. 1 and 5) having known temperature controls 137 and 138 connected therewith and adapted to maintain the ram temperature within a predetermined range. The ram 49 is maintained in the bonding position for a predetermined time by means of an adjustable timer T–3 to insure an effective bond of the splicing tape, following which the ram returns to its normal position shown in FIG. 5. On returning to its normal position, the ram trips the switch S–4 as shown in FIG. 5 which advances the stepping switch into its next sequence.

When the ram moves down to its tape bonding position, the stud 108 as pointed out above actuates the tape cutter blade 105 to cut off a measured length of tape previously positioned in the cutter by the tape advancing mechanism described above.

The ram 49 in returning to its normal raised position closes the switch S–4 to advance the stepping switch to its next step whereupon the solenoids SOL–5 and SOL–6 are energized to retract the film positioning pins 80 and 85. At the same time, the drive motor M–4 of the third feed roll unit 25 is started, pinch roll solenoid SOL–3 is energized and reel motor M–5 is started. This causes the spliced film to be advanced along the track and wound onto reel 55. When the trailing end of the film passes electric contact D–2, the solenoid SOL–6 of the second stop pin device 50 is deenergized to release the pin 85. When the pin 85 locates and enters the next film sprocket hole 44 as shown in FIG. 19, the motor M–4 of feed roll unit 25 and the reel motor M–5 are shut off and the cycle of operation is completed with the trailing end of the film strip positioned at the center of the splicing station 43 to receive the succeeding film splice.

OPERATION OF THE APPARATUS

For operation of the apparatus, the electrical heating elements 136 of the ram 49 are permitted to heat to the desired temperature which is then maintained by the temperature controls 137 and 138. The blower 88 is started to provide a ready source of compressed air for the nozzle 87. The stepping switch 77 is set at its starting position wherein the torque motor M–1 is energized to raise and hold the reciprocable comber device 30 in the elevated position shown in FIG. 1.

When initially setting the machine up for operation, a leader strip of film equal in length for example to the length of four twelve-exposure films is employed and includes spaced sprocket holes along one edge identical with those of the films to be spliced. The leading end of the leader strip is fastened to the reel 55 and the trailing end is positioned at the center of the splicing station 43. The first film length which is introduced into the machine is thus spliced onto the trailing end of the leader strip in the splicing station.

Considering now the specific operation of the machine through a cycle and with particular reference to the sequential control elements, the operation of the machine will first be described with respect to the splicing of a twelve exposure film onto either the leader or the preceding film. The machine having been primed as indicated above with a leader strip or having a previously spliced film positioned with its trailing edge centered in the splicing station, the machine operator removes a spool of film from its cartridge and introduces the leading edge of the film emulsion side down between the stripper pins 27 and guide rolls 28, advancing the film beneath the detector D–1 until the leading edge is in the nip of the feed roll unit 23. The remainder of the spool of film and the spool 21 due to the spooled tension thereof will remain directly beneath the stripper pins 27 with the loose end of the backer 40 hanging down therefrom as shown in FIG. 2. When the film passes under the detector D–1, the current through the detector is broken, signaling the stepping motor of the stepping switch 77 and advancing the stepping switch to its first step at which the solenoids SOL–2, SOL–3 and motors M–2 and M–3 are energized thereby actuating the feed roll units 23 and 24 to advance the film toward the splicing station. The torque motor M–1 continues to run thereby holding the comber device in its raised position during the infeed of the film to the splicing station.

When the leading edge of the film passes over the detector D–2, the current through the detector is broken thereby deenergizing solenoid SOL–5 of stop pin device 42, permitting the stop pin 80 to engage the film edge and seek the next sprocket hole 44 as shown schematically in FIG. 15.

When the leading edge of the film reaches the center of the splicing station thereby abutting the preceding film length or leader trailing edge, the stop pin 80 engages a sprocket hole 44 of the film as shown in FIG. 16, thereby anchoring the film in the correct position for splicing and at the same time permitting current to flow through the electrically conductive portion 82 thereof signaling the stepping motor of the stepping switch to advance the switch to the second step. At this second step, the feed motors M–2 and M–3 are stopped and the solenoids SOL–1 and SOL–2 are deenergized to stop the infeed of the film by the feed roll units 23 and 24. At the same time, the torque motor M–1 is deenergized, permitting the comber device 30 to fall by gravity and unwind the remaining film and backer from the spool 21. Since the film is a twelve exposure film, the comber device will trip the switch S–1 and hold the switch closed while the timer T–12 times out and energizes solenoid SOL–4 of the film cutter 29 to cut off the film in the proper registration. In FIG. 16, the film has just been cut off by the film cutter 29, and the nozzle 87 is about to aim a blast at the spool 21 to direct the spool and attached paper backer into an appropriately placed waste receptacle.

The actuation of the solenoid SOL-4 of the film cutter as shown in FIG. 6 trips the switch S-5 closing a circuit which advances the stepping switch to the third step at which the tape dispensing cycle described above is begun by actuating solenoid SOL-7 and motor M-6 to release the cam 110 for a single revolution thereby advancing a precut length of splicing tape beneath the abutting film edges in the splicing station. Upon completion of the cam revolution and the tape placement, the switch S-3 is released upon the reengagement of the claw 113 with the stop tooth 111, the switch S-3 sending an electrical signal which advances the stepping switch to the fourth step upon which the ram valve is actuated to lower the ram into heat sealing pressure engagement with the abutting film ends as shown schematically in FIG. 17. The timer T-3 controls the dwell of the ram in the sealing position. When the timer times out, the ram rises to its normal elevated position upon which the switch S-4 is tripped as shown in FIG. 5 to signal the stepping switch to its fifth position.

The splice now being completed, on the tripping of switch S-4, the stepping switch in the fifth position energizes solenoids SOL-5 and SOL-6 to retract the stop pins 80 and 85. At the same time, the reel motor M-5 and the feed roll unit motor M-4 are started and solenoid SOL-3 is energized thus causing a reeling of the spliced film onto the reel 55 by means of the reel drive and the feed roll unit 25 as shown in FIG. 18. When the trailing edge of the newly spliced film passes the detector D-2, the solenoid SOL-6 is deenergized to permit the stop pin 85 of the stop pin device 50 to engage the next film sprocket hole. As shown in FIG. 19, the stop pin 85 engages the film sprocket hole when the trailing edge of the film is aligned with the center line of the splicing station thereby locking the film in position for the next splicing operation and at the same time sending an electrical signal to return the stepping switch to the starting position thereby stopping motors M-4 and M-5 and starting the torque motor M-1 to raise the comber device to the elevated loading position. The described cycle is then repeated for the succeeding films until the reel 55 is filled with a single strip of spliced film whereupon the reel is removed from the apparatus and the spliced film strip is processed through a conventional automatic processing machine.

OPERATION WITH TWENTY EXPOSURE FILM

An important feature of the present invention resides in the fact that an intermix of film lengths, for example twelve exposure and twenty exposure, can be spliced together in random order without the necessity of making any adjustments to the machine. An operator working in the dark can thus pick any film of an intermix of sizes for feed into the machine without having to identify it or adjust the machine. By simply feeding the films into the machine in the manner described above, they will be properly spliced together automatically without special action by the operator. The illustrated machine is adapted to splice both twelve and twenty exposure films and the operation with a twenty exposure film will now be described.

The twenty exposure film is threaded into the machine in the same manner as described above with respect to the twelve exposure film and is advanced by the feed roll units 23 and 24 until the leading edge thereof reaches the splicing station 43 whereupon the stop pin device 42 actuated by the detector D-2 halts the advance of the film in the proper splicing position and stops the feed roll units. The torque motor M-1 is released as in the above-described operation to allow the comber device to travel downwardly by gravity. Up to this point, the operation is identical with that for the twelve exposure film.

Due, however, to the longer length of the twenty exposure film, the comber device passes by the upper switch S-1 and halts at the lower comber switch S-2. On closing of switch S-2, the stepping switch is moved to an alternate group of sequential steps which are identical with those described above except for two aspects. The first is that the film cutter 29 is not actuated for film cutoff prior to the tape dispensing and splicing steps. Instead, the tripping of switch S-2 moves the stepping switch directly into the tape dispensing and heat bonding steps as described above with respect to the twelve exposure film.

Upon completion of the splicing operation, the stop pins 80 and 85 are retracted as in the twelve exposure film but upon retraction of the stop pin 80 with the twenty exposure film, the timer T-20 is actuated which times out during the reeling of the spliced film onto the reel 55. When the timer T-20 times out after an accurately predetermined interval, the stop pin 80 is released to engage the next film sprocket hole and upon finding the hole, signals the film cutter 29 to cut off the film at the proper length interval. The film drive unit 25 and reel motor M-5 are halted during the cutoff operation. The actuation of the film cutter 29 through switch S-5 reenergizes the solenoid SOL-5 retracting the pin 80 and again starting the film drive unit 25 and the reel motor M-5 to complete the reeling of the spliced film. When the trailing edge of the film passes the detector D-2, the stop pin device 50 is actuated to release the stop pin 85 and the trailing film end is stopped on the center line of the splicing station in exactly the same manner as that described with respect to the twelve exposure film.

From the above, it can be understood that due to the sensing of the film length by the comber device 30 which will stop at either switch S-1 or S-2 depending on the length of the film, there is no need for the machine operator to predetermine the film length or to make any adjustment of the machine to account therefor. This is particularly advantageous when working under darkroom conditions and films may be thus fed to the machine at a rapid rate without concern for the film length. It can be understood that the machine can be adapted for use with films of more than two lengths simply by the addition of suitable switches and by a suitable programming of the stepping switch. For example, the machine could easily be adapted to accommodate either twenty or thirty-six exposure 35 mm. films. It should be understood that the apparatus is adapted for the splicing of other filmlike strips other than photographic films such as musical tapes, data processing tapes and the like.

Although the apparatus has been described as presenting the film ends in abutting relation in the splicing station, it should be understood that some slight spacing may be permitted between the film ends without affecting the strength of the splice or the registration of the sprocket holes. Some film handling equipment cuts the film into its original lengths by severing the gaps at the splices. It is a simple matter to provide such a gap by adjusting the position of the film cutter 29.

To adapt the apparatus for the splicing of previously developed, unspooled film, a stop plate 31a may be attached to hte lower end of track 31 as shown in between lines in FIG. 1. The stop plate 31a will stop the fall of the comber device with the cam surface 39 in engagement with switch S-2 for twenty exposure films and the film cut-off and splicing will proceed as indicated above. For twelve exposure rolls, a removable dowel spacer 31b is inserted in a socket in the stop plate and is of a length and so positioned as to arrest the fall of the comber device with cam surface 39 in engagement with switch S-1.

For splicing of previously developed unspooled film, the operator initially determines the film length. If a twenty exposure roll, the spacer 31b is removed; if a twelve exposure roll, the spacer 31b is inserted. The film is then fed into the machine in the identical manner described above and the splicing operation takes place automatically. The stop plate 31a and spacer 31b simply take the place of the film spool in halting the downward travel of the comber device at either switch S–1 or S–2.

The speed of operation of the present apparatus is in large measure due to the application of the splicing tape to the underside of the film and the application of the heated ram to the film itself. Since the film is a good heat conductor which the paper splicing tape is not, heat can be applied to the heat setting adhesive of the splicing tape much faster by heating the film rather than the tape. The lifter member 130 which permits insertion of the splicing tape beneath the film is thus an important aspect of the invention, permitting the bonding of the splicing tape in a fraction of a second.

As mentioned above, the film strips prior to splicing into a continuous length, are provided with suitable identifying markings which may be applied photographically, magnetically or mechanically to the film edge prior to feeding into the apparatus. Such procedures are conventional and thus require no further description.

In an alternate embodiment of the invention not illustrated, the detectors D–1 and D–2 are replaced by conventional limit switches, the detector arms of which extend through slots in the film track.

Similarly, other changes in details of construction can be effected by those skilled in the art without departing from the spirit and the scope of the invention.

I claim:

1. A splicing machine for automatically trimming and splicing together discrete lengths of photographic roll film having sprocket holes uniformly spaced along a side edge thereof, said machine comprising a splicing station, a first stop means for positioning a previously spliced length of film with its trailing end disposed in the splicing station, means for receiving a length of film to be spliced and automatically advancing the film toward said splicing station, a second stop means for automatically stopping the film advance when the leading end of the film is positioned in said splicing station adjacent the trailing end of the previously spliced film length, each said stop means comprising retractable pin means adapted to engage the film sprocket holes, said stop means being adapted to present the film lengths to the splicing station so as to maintain the registration of the sprocket holes, means for automatically cutting the advanced film to a predetermined length, means in said splicing station for automatically dispensing and bonding a length of splicing tape to the adjacent film ends upon positioning of the film ends in the splicing station, means for automatically releasing both said stop means and advancing the spliced lengths of film following bonding of the splicing tape, and means for actuating said first stop means to position the spliced run of film with its trailing end disposed in the splicing station ready for the splicing of a succeeding film length thereto.

2. Apparatus as claimed in claim 1 wherein said pin means comprises stop pins spring loaded into engagement with said film and solenoid actuated for retraction therefrom.

3. Apparatus as claimed in claim 2 including means for detecting the position of the leading and trailing film ends for activating the stop pins of said stop means.

4. A construction in accordance with claim 1 wherein said splicing tape dispensing means comprises cam controlled means for advancing a premeasured length of splicing tape toward the adjacent film ends, means for cutting off said premeasured length of tape, and pusher means for advancing said length of tape across the film ends for bonding thereto.

5. A construction in accordance with claim 1 wherein said tape dispensing means comprises a one revolution cam, a tape feed roll rotated by said cam for measuring and advancing a given length of tape towards the film joint, a cutter for cutting off said given length of tape, and means actuated by said cam to advance said given length of tape to the adjacent film ends for bonding thereto.

6. A construction in accordance with claim 5 and further including film lifting means actuated by the one revolution cam for lifting the edges of the adjacent film ends a sufficient amount to permit insertion of said cut off length of splicing tape therebeneath.

7. A construction in accordance with claim 5 and further including a pivoted lifter member in the splicing station having spaced side wings for lifting the edges of the adjacent film ends a sufficient amount to insert said cut off length of splicing tape therebeneath, a pivoted lever for actuating said lifter member and a cam lobe on said cam for actuating said lever.

8. A construction in accordance with claim 1 wherein said tape dispensing means comprises a one revolution cam, a tape feed roll having a shaft carrying a flipper plate, means actuated by said cam and engaging said flipper plate to rotate said flipper plate and the tape feed roll one half revolution for each revolution of the cam, the diameter of said feed roll being adapted to advance a length of splicing tape equal to the width of the films for each one half revolution thereof, a cutter for cutting off said fed length of tape, and a pusher shoe actuated by said cam during its revolution to advance said cut off length of splicing tape across the adjacent ends of the film for bonding thereto.

9. A construction in accordance with claim 1 wherein said splicing tape dispensing means comprises a one revolution cam having a single stop tooth, a spring loaded pivoted claw associated with said stop tooth, a solenoid adapted to trigger said claw to permit one revolution of the cam, a splicing tape feed roll and flipper plate, a combined feed roll actuator and splicing tape pusher shoe pivotally mounted on said cam, said actuator having a tab adapted to engage said flipper plate to rotate the tape feed roll one half revolution for each revolution of the cam, the diameter of the tape feed roll being calculated to advance a length of splicing tape equal to the width of the film for each one half revolution thereof, a cutter for cutting off said advanced length of tape, and a cam plate on which said actuator is adapted to ride so that, as the one revolution cam rotates, the pusher shoe engages the cut off length of splicing tape and advances it across the adjacent film ends for bonding thereto.

10. The combination recited in claim 1 wherein the film advancing means comprises a motor driven feed roll, a pinch roll associated with the feed roll, a pivotable arm carrying the pinch roll, and means for pivoting said arm toward or away from said feed roll, whereby a feed of said film is effected upon pinching of said film between said feed roll and said pinch roll.

11. The combination recited in claim 10 wherein said last mentioned means comprises a solenoid connected when energized to pivot said arm and pinch roll into film feeding position and when de-energized to allow return of the arm and pinch roll into an inactive position.

12. A splicing machine as claimed in claim 1 including substantially horizontal track means for guiding said film to and from said splicing station with the emulsion side of said film facing downwardly, and means for lifting the adjoining edges of the film lengths in the splicing station prior to dispensing of the splicing tape, said splicing tape dispensing means being adapted to position the splicing tape beneath the film ends, said splicing tape having a heat setting adhesive coating on its upper face for engagement with the film ends, said bonding ram being adapted to contact the upper surface of said film ends to effect a heat setting of said splicing tape to the undersurface of the film ends.

13. A splicing machine as claimed in claim 1 including a receiving reel for the spliced strip of film, and means for feeding and winding the spliced film onto said reel.

14. A splicing machine for automatically trimming and splicing together photographic roll films of varying lengths having sprocket holes uniformly spaced along a side edge thereof, said films together with a paper backer being initially wound on spools, said machine comprising a splicing station, a first stop means for positioning a previously spliced length of film with its trailing end disposed in the splicing station, means for receiving a length of film to be spliced and automatically advancing the film toward said splicing station, a comber device for stripping the backer from the film and unspooling the film to determine its length, a second stop means for automatically stopping the film advance when the leading end of the film is positioned in said splicing station adjacent the trailing end of the previously spliced film length, each of said stop means comprising retractable pin means adapted to engage the film sprocket holes, said stop means being adapted to present the film lengths to the splicing station so as to maintain the registration of the sprocket holes, means responsive to said comber device for cutting the film in accordance with its length to remove the backer and spool, means in said splicing station for automatically dispensing and bonding a length of splicing tape to the adjacent film ends upon positioning of the film ends in the splicing station, means for automatically releasing both said stop means and advancing the spliced lengths of film following bonding of the splicing tape, and means for actuating said first stop means to position the spliced run of film with its trailing end disposed in the splicing station ready for the splicing of a succeeding film length thereto.

15. An automatic film splicing machine in accordance with claim 14 wherein said comber device comprises a movable comber plate having stripper pins between which the film is threaded and against which the spool bears, and means for effecting movement of the comber plate in a direction to cause said stripper pins to strip the paper backer from the film, and to unwind the film from the spool.

16. An automatic film splicing machine in accordance with claim 14 wherein the comber device comprises a comber plate having stripper pins between which the film is threaded and against which the spool bears, means movably supporting said comber plate for vertical reciprocation, means for imparting upward movement to the comber plate to hold the plate in a raised film loading position, and means for releasing said motor to permit said comber plate and stripper pins to move downwardly by gravity and thereby unwind the paper backer strip and film from the spool.

17. A machine in accordance with claim 14 including means activated by said comber plate when said film and paper backer is fully unwound and taut for controlling operation of said film cutting means.

18. The invention as claimed in claim 14 wherein said film cutting means includes an actuating solenoid and wherein the comber device is provided with switch means responsive to termination of movement of the comber device for energizing the solenoid of said film cutting means to cut off the film in accordance with the film length presented.

19. The invention as claimed in claim 18 wherein the comber device is provided with a plurality of switches each adapted to energize said film cutting means solenoid at a time dependent on the length of the film introduced into the machine.

20. The invention as claimed in claim 19 wherein each said comber device switch includes an associated timer whereby a given switch will actuate said film cutting means solenoid only after said comber device comes to rest in engagement with said switch.

References Cited

UNITED STATES PATENTS

| 2,661,164 | 12/1953 | Badmaieff | 242—57 |
| 2,745,605 | 5/1956 | Speed et al. | 242—58.1 |
| 3,152,227 | 10/1964 | Durio | 156—506 |
| 3,162,565 | 12/1964 | Miller et al. | 156—506 |
| 3,208,895 | 9/1965 | Williams et al. | 156—584 |
| 3,245,861 | 4/1966 | Roshkind | 242—58.5 |
| 3,306,801 | 2/1967 | Giles | 156—504 |
| 3,306,546 | 2/1967 | Ryan | 242—58.2 |
| 3,323,284 | 6/1967 | Lagesse | 156—506 |

SAMUEL FEINBERG, Primary Examiner

R. E. HART, Assistant Examiner

U.S. Cl. X.R.

156—504, 506; 242—58.1